United States Patent
Diedrichs

(10) Patent No.: US 11,173,928 B2
(45) Date of Patent: Nov. 16, 2021

(54) RAIL VEHICLE HAVING AN IMPROVED COOLING SYSTEM AND METHOD FOR ITS INTERNAL COMBUSTION ENGINE

(71) Applicant: Bombardier Transportation GmbH, Berlin (DE)

(72) Inventor: Ben Diedrichs, Sundbyber (SE)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 17/005,409

(22) Filed: Aug. 28, 2020

(65) Prior Publication Data

US 2021/0061317 A1    Mar. 4, 2021

(30) Foreign Application Priority Data

Aug. 30, 2019   (CA) .................. CA 3053689

(51) Int. Cl.
| | |
|---|---|
| *B61C 5/02* | (2006.01) |
| *F01P 3/18* | (2006.01) |
| *F01P 5/04* | (2006.01) |

(52) U.S. Cl.
CPC .......... *B61C 5/02* (2013.01); *F01P 3/18* (2013.01); *F01P 5/04* (2013.01); *F01P 2005/046* (2013.01)

(58) Field of Classification Search
CPC ....... B61C 5/02; F01P 5/04; F01P 3/18; F01P 2005/046
See application file for complete search history.

(56) References Cited

U.S. PATENT DOCUMENTS

| | | | |
|---|---|---|---|
| 8,495,960 B2* | 7/2013 | Willbrandt | B61C 5/04 105/62.1 |
| 9,796,244 B2 | 10/2017 | Cook et al. | |
| 2002/0036076 A1* | 3/2002 | Eastman | F28D 15/0266 165/45 |
| 2006/0118281 A1 | 6/2006 | Radke et al. | |
| 2007/0007061 A1 | 1/2007 | Meyer et al. | |
| 2018/0319247 A1* | 11/2018 | Gotmalm | B61D 27/0027 |

FOREIGN PATENT DOCUMENTS

| | | |
|---|---|---|
| CN | 1690379 A | 11/2005 |
| CN | 104791071 A | 7/2015 |
| CN | 106246324 A | 12/2016 |
| CN | 206522199 U | 9/2017 |
| JP | H1086819 A | 4/1998 |
| JP | 3225200 B2 * | 11/2001 |
| JP | 3225200 B2 | 11/2001 |
| JP | 2007016779 A | 1/2007 |

* cited by examiner

*Primary Examiner* — Jacob M Amick
*Assistant Examiner* — Charles J Brauch
(74) *Attorney, Agent, or Firm* — The Webb Law Firm

(57) ABSTRACT

A cooling system for a rail vehicle having an internal combustion engine as a generator of electricity is operative to exchange heat between a cooling fluid circulating in a cooling circuit connected to the internal combustion engine and air located in an underfloor space of the rail vehicle. A heat exchanger and a fan, located in the underfloor space, are fluidly connected to an exhaust in a side skirt depending from a floor of the rail vehicle. The fan is operative to force air from the underfloor space through the heat exchanger and through the exhaust to an ambient space located on an external side of the side skirt.

19 Claims, 5 Drawing Sheets

RAIL VEHICLE HAVING AN IMPROVED COOLING SYSTEM AND METHOD FOR ITS INTERNAL COMBUSTION ENGINE

CROSS-REFERENCE TO RELATED APPLICATION

This application claims priority to Canadian Patent Application No. 3053689 filed Aug. 30, 2019, the disclosure of which is hereby incorporated by reference in its entirety.

BACKGROUND OF THE INVENTION

Field of the Invention

The present invention generally relates to the field of diesel-electric rail vehicles. More specifically, the invention relates to an improved cooling system and a method for evacuating heat generated by a diesel engine of the diesel-electric rail vehicle.

Technical Considerations

Diesel-electric rail vehicles, such as locomotives, power cars, or diesel electric multiple units (DEMU) use a diesel engine to generate electricity to power electric motors connected to the wheels of the vehicles. These diesel engines typically have an efficiency ranging approximately between 40% and 60%, which means that about 40% to 60% is wasted in large quantities of heat which must be evacuated.

It is common to arrange the cooling units used to cool the diesel engine of a railcar under its floor where fresh air may be ingested from the sides of the vehicle, circulated through the cooling units and evacuated as hot air within the underfloor of the vehicle. It is thought that, as the rail vehicle circulates, hot air is somewhat naturally evacuated from the underfloor.

It has however been found that this type of arrangement may in fact lead to substantial increase in air temperatures within the underfloor, which may in turn compromise the operation of other pieces of equipment also located within the underfloor of the vehicle. In trains where propulsion and diesel engines are distributed, heat may even accumulate within the underfloor towards the rear of the train, exacerbating this problem.

There is therefore a need for an improved cooling system and method.

SUMMARY OF THE INVENTION

It is an object of the present invention to provide a cooling system for a rail vehicle and a method of cooling a diesel engine of a rail vehicle that overcomes or mitigates one or more disadvantages of known cooling systems and methods, or at least provides a useful alternative.

The invention provides the advantages of evacuating hot air from an underfloor of the rail vehicle and thereby avoiding subjecting other undercar pieces of equipment to unnecessarily high temperatures.

In accordance with an embodiment of the present invention, there is provided a rail vehicle comprising a body, a first and a second side skirts, two bogies supporting a different end of the body, an internal combustion engine, a motor, and a cooling system for cooling the engine. The body has a floor and lateral side walls projecting upwardly from the floor. The first and the second side skirts project downwardly below the floor and at least partially along a respective one of the side walls. At least one of the side skirts is provided with an exhaust, such as the first side skirt. Each bogie is provided with wheels. The floor, the first and second side skirts and the bogies define an inner, or underfloor, space there in between. The internal combustion engine is adapted to generate electricity to be supplied to the electric motor. The cooling system is operative to exchange heat between a cooling fluid circulating in a cooling circuit connected to the internal combustion engine and air located in the underfloor space. The cooling system has a heat exchanger and a fan adjacent the heat exchanger, both being installed under the floor and within the underfloor space. The heat exchanger and the fan are fluidly connected to the exhaust. The fan is operative to force air from the underfloor space through the heat exchanger and through the exhaust to an ambient space located on an external side of the first side skirt.

Optionally, the heat exchanger may be placed adjacent to the first side skirt and the fan may be placed adjacent an inner face of the heat exchanger, the fan being operative to push air located within the underfloor space through the heat exchanger, through the adjacent first side skirt and into the ambient space.

Alternatively, the fan may be placed adjacent to the first side skirt and the heat exchanger may be located on an inner face of the fan. The fan is operative to draw air located within the underfloor space through the heat exchanger, and push this air through the adjacent first side skirt and into the ambient space.

An air intake for directing fresh air into the underfloor space may be provided in one or both of the side skirts. This air intake may be located on either or both of the side skirts, closer to a front of the body than the exhaust. The air intake may be a scoop located at a lower portion of the underfloor space.

The cooling system may further comprise a second heat exchanger and a second fan, which are also located under the floor and within the underfloor space. The second fan is adjacent to the second heat exchanger. The second heat exchanger and the second fan are fluidly connected to a second exhaust located in the second side skirt. The second fan is operative to force air from the underfloor space through the second heat exchanger, through the second exhaust and into the ambient space located on an external side of the second side skirt.

Both fans comprise an impeller which is oriented so as to draw air from the underfloor space to the ambient space. If the fan is powered by DC current, the voltage has its polarity such that the impeller spins in a direction to draw air from the underfloor space and into the ambient space. If the fan is powered by AC current, the phases must be adapted so that the impeller spins in a direction that draws air from the underfloor space into the ambient space.

Optionally, the motor is connected to one of the wheels.

In accordance with another embodiment of the present invention, there is provided a train comprising the rail vehicle as described above connected to an adjacent second rail vehicle wherein the motor is installed on a third bogie supporting the adjacent second rail vehicle.

In accordance with another embodiment of the present invention there is provided a method for cooling the internal combustion engine of a rail vehicle having a body, two bogies supporting the body and a cooling system having a heat exchanger for cooling the internal combustion engine. The body has a floor, two side skirts depending from the floor and aligned along a respective longitudinal side of the floor. The two side skirts, the two bogies and the floor define an underfloor space there in between. The method comprises sequentially circulating air:

from the underfloor space;

through the heat exchanger located within the underfloor space;

through an exhaust located in a first one of the two side skirts; and to an ambient space located on an external side of the first side skirt.

Optionally, the method may comprise locating a fan of the cooling system adjacent an internal side of the first side skirt and locating the heat exchanger adjacent the fan, opposite the first side skirt.

Preferably, the method comprises spinning an impeller of the fan so as to draw air from the underfloor space to the ambient space.

The method may comprise using side skirts to create an underfloor space in substantially relatively close proximity to a ground on which the rail vehicle is travelling.

Air located in the underfloor space may be circulated through a fan prior to circulating the air through the heat exchanger.

Alternatively, the air located in the underfloor space may be circulated through the heat exchanger prior to circulating it through the fan.

The circulating through the heat exchanger may further comprise transferring heat to the air to create hot air. The circulating air through the exhaust may also comprise exhausting the hot air towards the ambient space.

BRIEF DESCRIPTION OF DRAWINGS

These and other features of the present invention will become more apparent from the following description in which reference is made to the appended drawings wherein.

DETAILED DESCRIPTION OF THE INVENTION

The present invention relates to a rail vehicle having a cooling system and using a cooling method that evacuates hot air away from an underfloor space of a rail vehicle in order to prevent negatively affecting the performance of other pieces of equipment located within the underfloor space.

Figure 1:
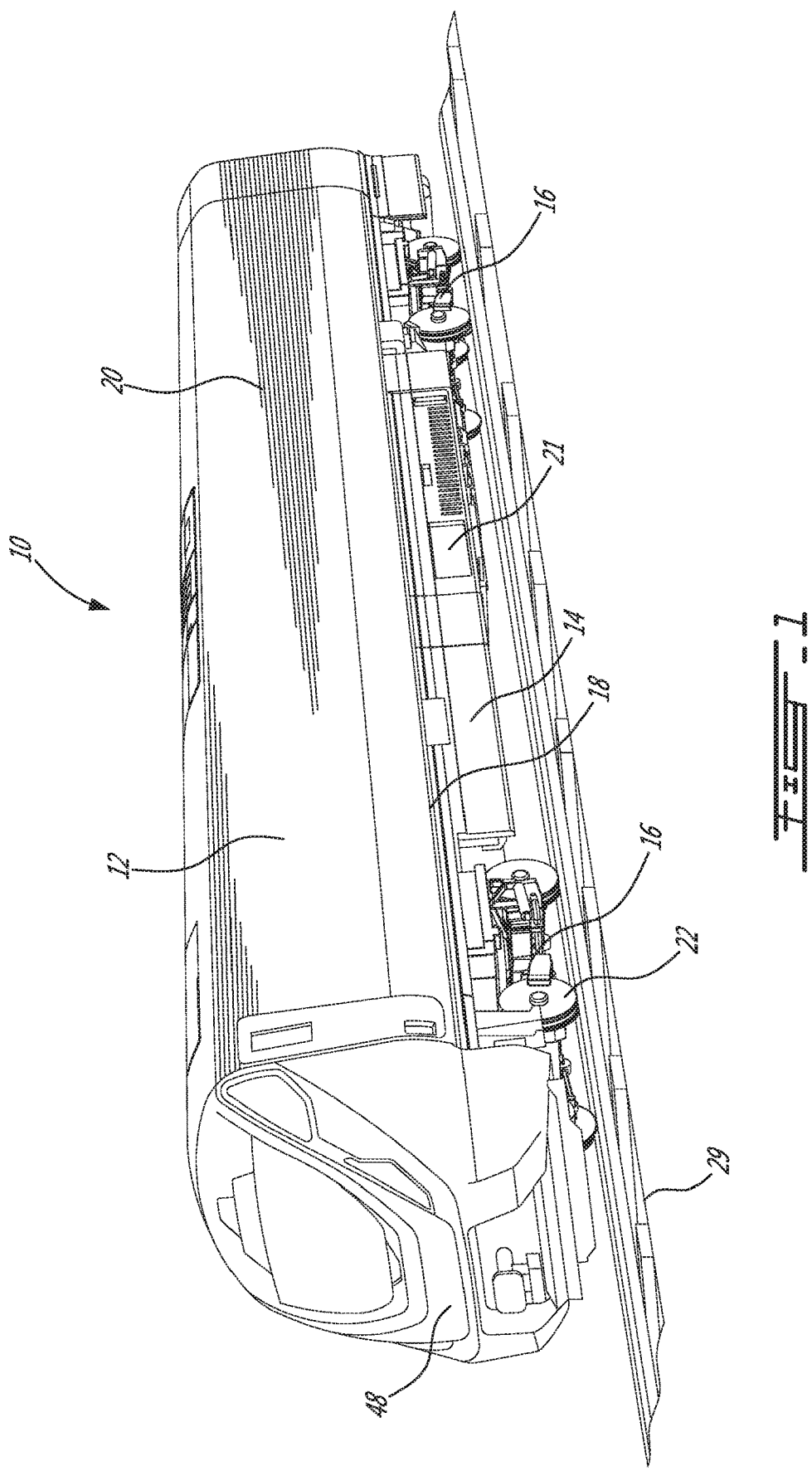
FIG. 1 is a perspective view of a rail vehicle in accordance with an embodiment of the present invention.
Figure 2:
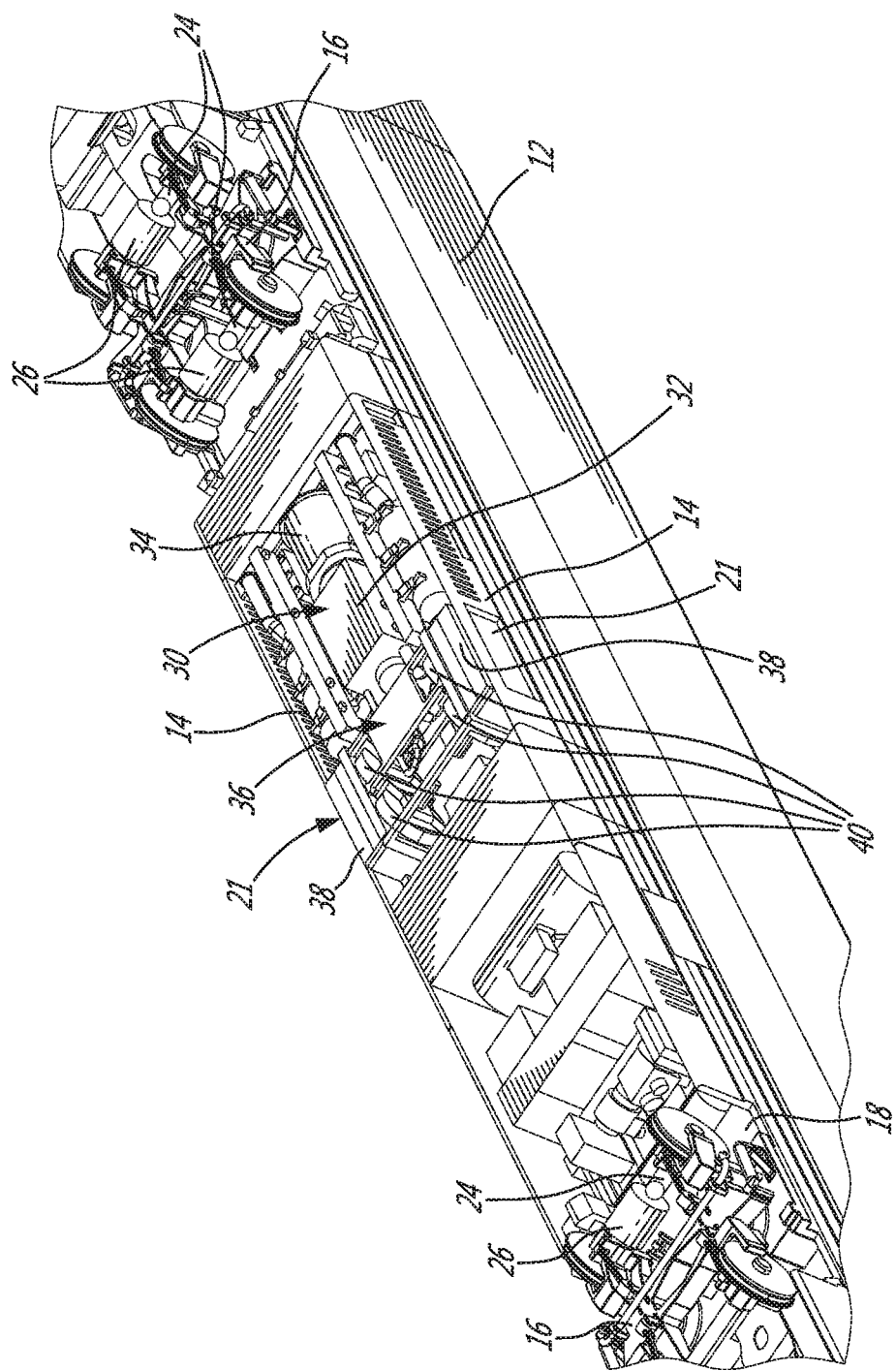
FIG. 2 is a partial perspective view from underneath of the rail vehicle of FIG. 1.

FIGS. 1 and 2 are concurrently referred to. A rail vehicle 10 comprises a body 12, side skirts 14 and two bogies 16 supporting a different end of the body 12. The body 12 has a floor 18 and side walls 20 projecting upwardly from the floor 18. Each bogie 16 is provided with wheels 22, sometimes independent, but usually installed on a wheel-axle 24. One electric motor 26 powers at least one wheel 22, and usually a single wheel-axle 24, per bogie 16. Often, each bogie 16 is provided with one electric motor 26 per wheel-axle 24.

Figure 3:
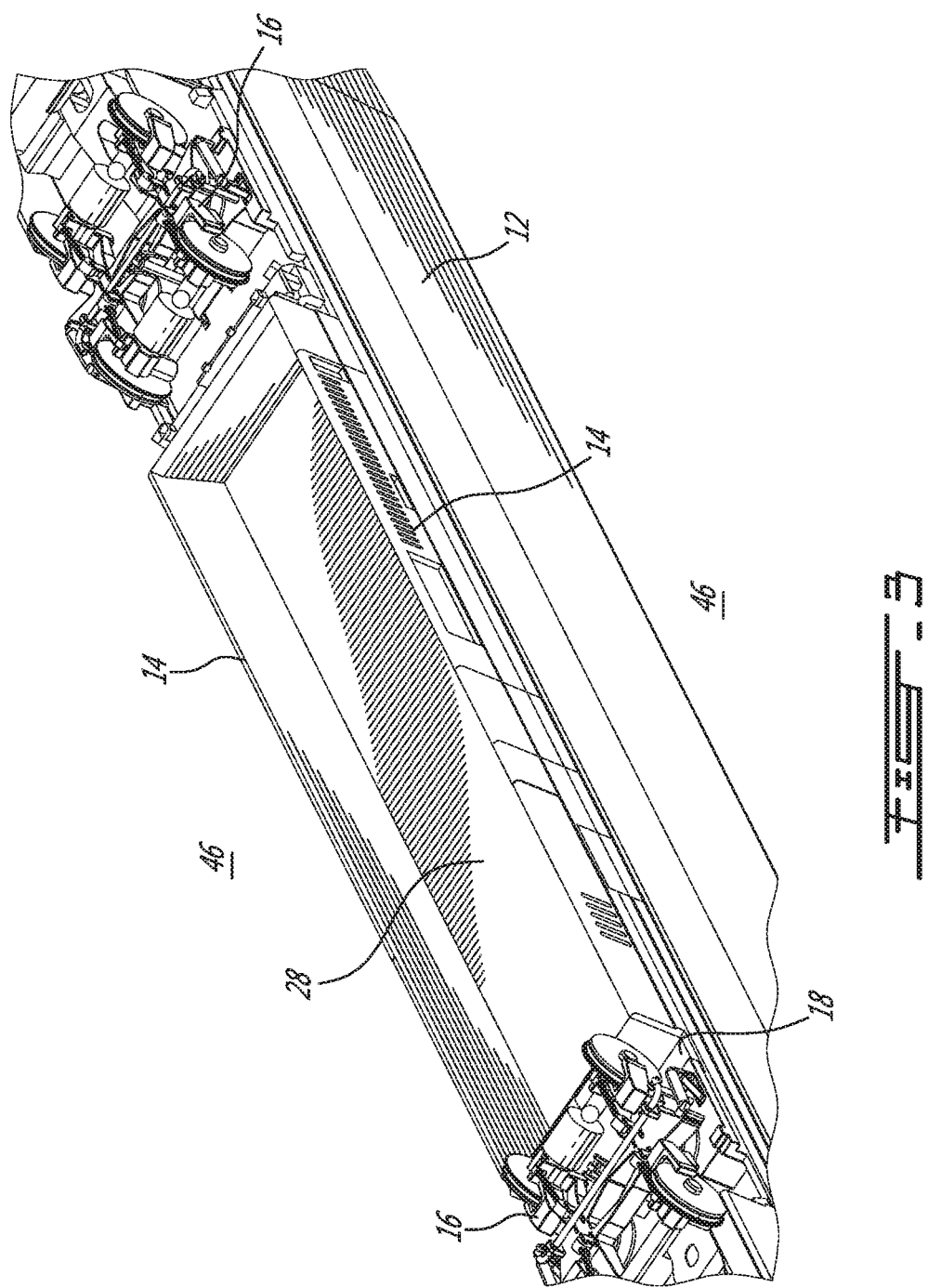
FIG. 3 is a partial perspective view from underneath of the rail vehicle of FIG. 1 showing the underfloor space.

Both side skirts 14 depend from the floor 18 and project at least partially along, or substantially along, a respective one of the side walls 20, or a respective one of the longitudinal sides of the floor 18. Each side skirt 14 is provided with an air exhaust 21 for exhausting hot air, as will be described later. The floor 18, the two side skirts 14 and the two bogies 16 define the limits of an underfloor space 28, best represented in FIG. 3, now concurrently referred to. The side skirts 14 are therefore used to create the underfloor space 28 in substantially close proximity to a ground 29 on which the rail vehicle 10 is travelling, which, up to a certain point, prevents mixing air from the underfloor space 28 with ambient air on each lateral side of the rail vehicle 10.

The rail vehicle 10 is provided with a power pack 30 comprising an internal combustion engine (ICE) 32, usually a diesel engine, mechanically connected to a generator 34 for generating electrical power for the electric motors 26 located on the bogies 16. The power pack 30 also comprises a cooling system 36 for cooling the ICE The cooling system 36 is a closed loop system circulating a cooling fluid between heat exchangers 38 and the ICE 32, thereby exchanging heat between the cooling fluid and air located in the underfloor space 28. The cooling system 36 may use one or more heat exchanger 38, depending on operating conditions and on the quantity of heat to be dissipated. Each heat exchanger 38 is provided with one or more fans 40. When one heat exchanger 38 is used, it is placed on either one side of the body 12. When two heat exchangers 38 are required, they usually are located symmetrically on each side of the body 12. All heat exchangers 38 are similarly connected to the ICE 32.

Figure 4:
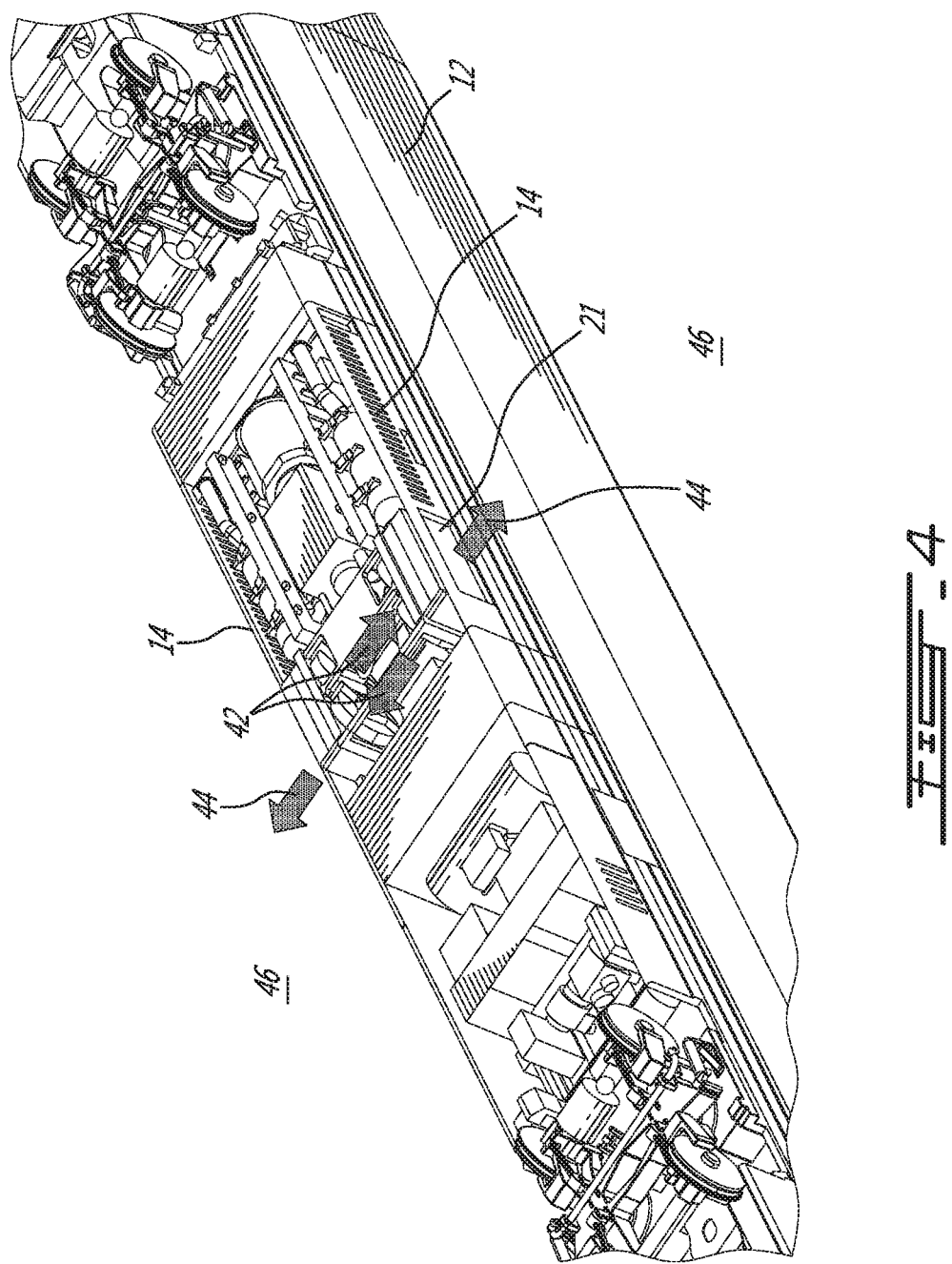
FIG. 4 is a partial perspective view from underneath of the rail vehicle of FIG. 1 showing the flow of air in accordance with an embodiment of the present invention.

One or more fans 40 are placed adjacently to each heat exchangers 38. In FIG. 2, the heat exchangers 38 are placed between the fans 40 and the side skirts 14. FIG. 4 is now concurrently referred to. In this configuration, fresh air 42 in the underfloor space 28 is drawn by the fans 40, thereby creating an outwardly flow of air. This fresh air 42 is then pushed through the heat exchangers 38 to cool the cooling fluid running in the heat exchangers 38 and then expelled as hot air 44 through the air exhaust 21 in the adjacent side skirts 14 into ambient space 46 on each lateral sides of the rail vehicle 10. Each stack of fans 40, heat exchanger 38 and exhaust 21 may be ducted to ensure all hot air 44 is expelled from the underfloor space 28. Ambient space 46 is here understood to be the surrounding space on each lateral side of the rail vehicle 10, but not underneath the rail vehicle 10 as the space below the rail vehicle 10 is relatively small and is influenced by the proximity between the side skirts 14 and the ground 29 on which the rail vehicle 10 travels.

Figure 5:
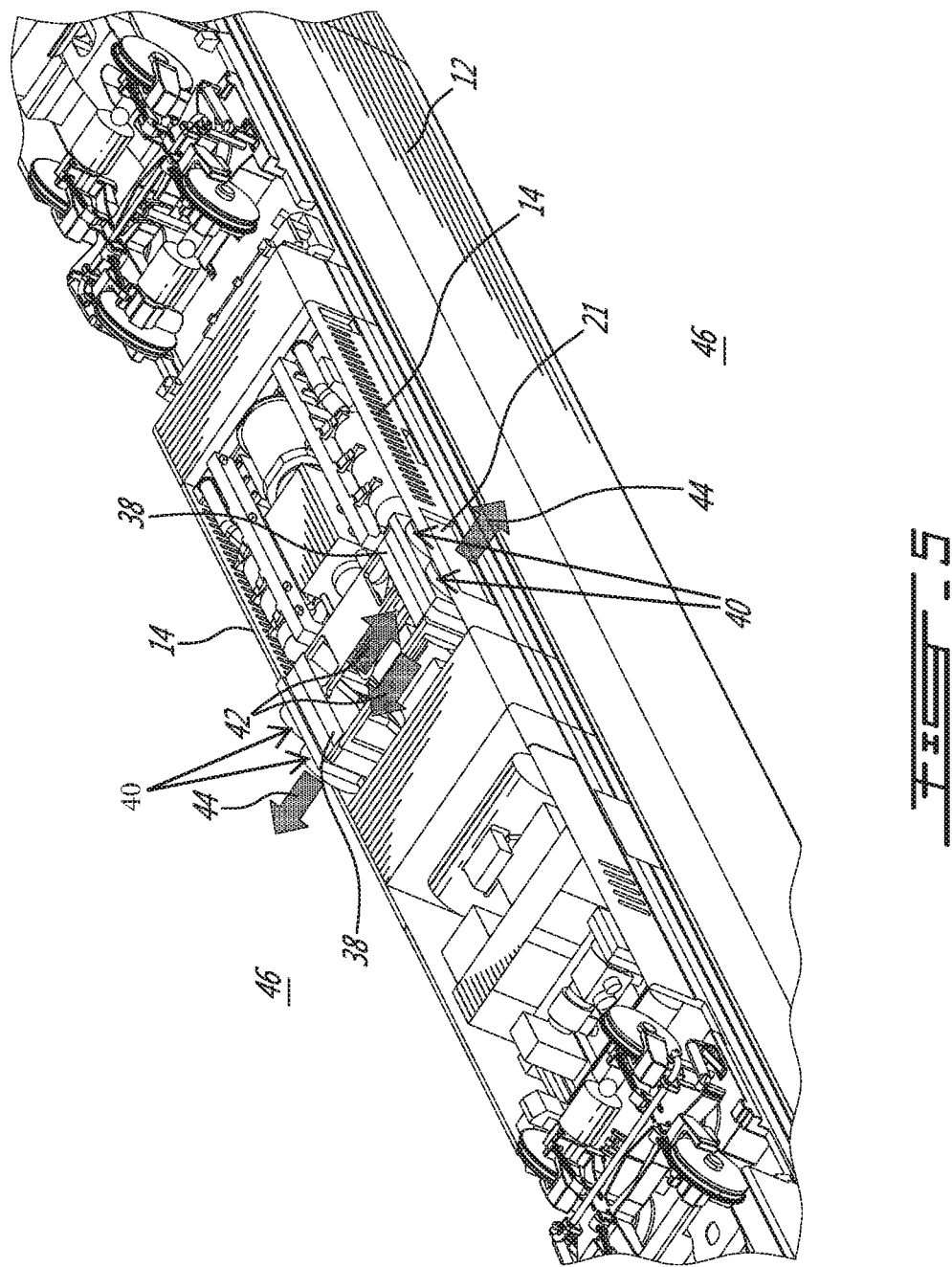
FIG. 5 is a partial perspective view from underneath of a rail vehicle showing the flow of air in accordance with another embodiment of the present invention.

In an alternate configuration depicted in FIG. 5, now concurrently referred to, the fans 40 are placed between the side skirts 14 and the heat exchangers 38, adjacently to the side skirts 14, and in fluid communication with the air exhaust 21. The heat exchangers 38 are placed adjacently to the fans 40, on the opposite side of the side skirts 14. In this configuration, fresh air 42 present in the underfloor space 28 is drawn by the fans 40, thereby creating an outwardly flow of air. This fresh air 42 first passes through the heat exchangers 38 where it picks up heat from the cooling fluid, through the fans 40 themselves, and then pushed outside as hot air 44 through the air exhaust 21 and into the ambient space 46. If electric motors used by the fans 40 have a tendency to get warm under load, this configuration may be preferable as it avoids the fans' electric motors from warming fresh air 42 before it circulates through the heat exchangers 38.

There are different ways the fan 40 may be made to draw air from the underfloor space 28 to the ambient space 46. Each fan 40 is equipped with an impeller. Blades of this impeller are oriented so as to draw air in a predetermined direction. Hence, the fans 40 need to be installed in the right direction to make air from the underfloor 28 circulate towards the ambient space 46. If the fan 40 is powered by DC current, the polarity of the voltage is set such that the impeller spins in a direction to draw air from the underfloor space 28 and into the ambient space 46. If the fan 40 is powered by AC current, the phases must be adapted so that its impeller spins in a direction that draws air from the underfloor space 28 into the ambient space 46.

The air exhaust 21 may be designed so that it creates a venturi effect when the rail vehicle 10 is circulating at speed. Indeed, when the rail vehicle 10 is in motion, the air velocity is much greater on each lateral sides of the rail vehicle 10 than it is within the underfloor space 28, resulting in even more efficient extraction of air from the underfloor space 28 to the ambient air if that venturi effect is taken advantage of. The side skirts 14 are important in benefitting from the venturi effect as they reduce mixing of air between the underfloor space 28 and the ambient space 46.

In its most basic form, the air drawn by the fans 40 is simply air filling the underfloor space 28. Alternatively, an air intake may be used to direct fresh air 42 into the underfloor space 28. Such air intake may be provided in one or both of the side skirts, preferably located closer to a front 48 of the body 12 than the air exhaust 21 so that hot air 44 is not picked up by the air intake. Another possible design is to add a scoop or deflector at a lower portion of the underfloor space 28 to direct air coming from under the rail vehicle at speed into the underfloor space 28.

In the present example, the whole power pack 30 is completely located in the underfloor space 28. This is typical of rail vehicles known as Diesel Multiple Units (DMU). However, in some rail vehicles such as large locomotives, the power pack may be split: the ICE 32 and the generator 34 may be located above the floor 18 while heat exchangers 38 may be located either above the floor 18 or below the floor 18, in the underfloor space 28. In other vehicles, the whole power pack 30 may be located above the floor 18. The present invention is solely concerned with the specific case where at least the heat exchangers 38 are located within the underfloor space 28. This is because the relatively close proximity of the ground 29 to the side skirts 14 and to the floor 18 create a confined area limiting the escape of hot air 44 from the underfloor 28. This is however not a problem when the heat exchangers 38 may be placed above the floor 18 since this proximity with the ground 29 is of no influence with this later design.

In use, air from the underfloor space 28 is circulated following the flow shown in FIG. 4. Air from the underfloor space 28 is circulated by the fans 40 in sequence 1) through their respective adjacent heat exchanger 38; then 2) through the exhaust 21 of the respective side skirt 14 the heat exchanger 38 is adjacent to; and finally 3) to the ambient space 46 surrounding the rail vehicle 10.

Optionally, a flow of air may be created either by positioning the fan 40 between the side skirt 14 and the heat exchanger 38 or by positioning the heat exchanger 38 between the side skirt 14 and the fan 40. In the first case, fresh air 42 from the underfloor space 28 flows through the heat exchanger 38 first, then through the fan 40, and finally exits as hot air 44 to the ambient space 46 through the exhaust 21. In the second case, fresh air 42 from the underfloor space 28 flows through the fan 40 first, then through the heat exchanger 38 and finally exits as hot air 44 to the ambient space 46 through the exhaust 21. The flow of air is created by spinning the impeller of the fan 40 in a direction allowing to draw fresh air 42 from the underfloor space 28 to the ambient space 46.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

What is claimed is:

1. A rail vehicle comprising:
a body having a floor and side walls projecting upwardly from said floor;
a first side skirt and a second side skirt projecting downwardly below said floor and along a portion of a respective one of said side walls, said first side skirt having an exhaust;
two bogies having wheels and operative to support a different end of said body, said floor, said first and second side skirts and said bogies defining an underfloor space therein between;
an air intake for directing fresh air into said underfloor space;
an internal combustion engine for generating power to be supplied to an electric motor, the internal combustion engine positioned in said underfloor space and surrounded by air located in said underfloor space;
a cooling system operative to exchange heat between a cooling fluid circulating in a cooling circuit connected to said internal combustion engine and air located in said underfloor space, said cooling system having:
a heat exchanger located under said floor and within said underfloor space, said heat exchanger being fluidly connected to said underfloor space on a first side of said heat exchanger and to said exhaust on a second side of said heat exchanger;
a fan adjacent said heat exchanger and fluidly connected to said exhaust,
wherein said fan is operative to sequentially force the air drawn into said underfloor space through the air intake from said underfloor space and surrounding said internal combustion engine through said first side of said heat exchanger, through said second side of said heat exchanger and through said exhaust to an ambient space located on an external side of said first side skirt.

2. The rail vehicle of claim 1, wherein said heat exchanger is adjacent said first side skirt, and wherein said fan is adjacent an inner face of said heat exchanger, said fan being operative to push air located within said underfloor space through said heat exchanger, through said exhaust of said first side skirt and into the ambient space.

3. The rail vehicle of claim 1, wherein said fan is adjacent said first side skirt and wherein said heat exchanger is located on an inner face of said fan, said fan being operative to draw air located within said underfloor space through said heat exchanger and push the air through said exhaust of said first side skirt into the ambient space.

4. The rail vehicle of claim 1, wherein said air intake is located on one of said first and second side skirts.

5. The rail vehicle of claim 4, wherein said air intake is located closer to a front of said body than said exhaust.

6. The rail vehicle of claim 1, wherein said air intake is a deflector located at a lower portion of said underfloor space for directing fresh air into said underfloor space.

7. The rail vehicle of claim 1, wherein said cooling system further comprises a second heat exchanger located under said floor and within said underfloor space and a second fan adjacent said second heat exchanger, said second heat exchanger and said second fan being fluidly connected to a second exhaust located in said second side skirt, said second fan being operative to force air from said underfloor space through said second heat exchanger and through said second exhaust to said ambient space located on an external side of said second side skirt.

8. The rail vehicle of claim 1, wherein said fan comprises an impeller, said impeller being oriented so as to draw air from said underfloor space to said ambient space.

9. The rail vehicle of claim 8, wherein said fan is powered by DC voltage having a polarity so that said impeller spins in a direction so as to draw air from said underfloor space to said ambient space.

10. The rail vehicle of claim 8, wherein said fan is powered by AC current having a phase adapted so that said impeller spins in a direction so as to draw air from said underfloor space to said ambient space.

11. The rail vehicle of claim 1, wherein said motor is connected to one of said wheels.

12. A train comprising the rail vehicle of claim 1 connected to an adjacent second rail vehicle wherein said motor is installed on a third bogie supporting said adjacent second rail vehicle.

13. A method for cooling an internal combustion engine of a rail vehicle, said rail vehicle having a body, two bogies supporting said body and a cooling system having a heat exchanger for cooling said internal combustion engine, said body having a floor and two side skirts depending from said floor and substantially aligned along a respective longitudinal side of said floor, said two side skirts, said two bogies and said floor defining an underfloor space therein between, an air intake for directing fresh air into said underfloor space, said internal combustion engine positioned in said underfloor space and surrounded by air located in said underfloor space, said heat exchanger being fluidly connected to said underfloor space on a first side of said heat exchanger and to an exhaust on a second side of said heat exchanger, the method comprising sequentially circulating air drawn into said underfloor space through the air intake and surrounding said internal combustion engine:
    from said underfloor space; then
    through first side and then through said second side of said heat exchanger located within said underfloor space; then
    through said exhaust located in a first one of said two side skirts; and
    to an ambient space located on an external side of said first one of said two side skirts.

14. The method of claim 13, further comprising locating a fan of said cooling system adjacent an internal side of said first one of said two side skirts and locating said heat exchanger adjacent said fan.

15. The method of claim 14, further comprising spinning an impeller of said fan so as to draw air from said underfloor space to said ambient space.

16. The method of claim 13, further comprising creating an underfloor space in substantially close proximity to a ground on which the rail vehicle is travelling using said two side skirts.

17. The method of claim 13, further comprising circulating air located in said underfloor space through a fan prior to circulating said air through said heat exchanger.

18. The method of claim 13, further comprising circulating air located in said underfloor space through said heat exchanger prior to circulating said air through a fan placed between said heat exchanger and said first one of said two side skirts.

19. The method of claim 13, wherein said circulating through said heat exchanger comprises transferring heat to said air to create hot air, said circulating through said exhaust comprising exhausting said hot air towards said ambient space.

* * * * *

UNITED STATES PATENT AND TRADEMARK OFFICE
CERTIFICATE OF CORRECTION

| | | |
|---|---|---|
| PATENT NO. | : 11,173,928 B2 | Page 1 of 1 |
| APPLICATION NO. | : 17/005409 | |
| DATED | : November 16, 2021 | |
| INVENTOR(S) | : Ben Diedrichs | |

It is certified that error appears in the above-identified patent and that said Letters Patent is hereby corrected as shown below:

In the Claims

Column 6, Line 55, Claim 2, delete "skirt," and insert -- skirt --

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*